(12) United States Patent
Huang et al.

(10) Patent No.: US 11,328,840 B2
(45) Date of Patent: May 10, 2022

(54) HIGH FREQUENCY SIGNAL TRANSMISSION CABLE AND PRODUCING METHOD THEREFOR

(71) Applicant: Hitachi Metals, Ltd., Tokyo (JP)

(72) Inventors: Detian Huang, Tokyo (JP); Takanobu Watanabe, Tokyo (JP); Kimika Kudo, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/673,198

(22) Filed: Nov. 4, 2019

(65) Prior Publication Data

US 2021/0151222 A1 May 20, 2021

(30) Foreign Application Priority Data

Jul. 11, 2019 (JP) .............................. JP2019-129378

(51) Int. Cl.
| | | |
|---|---|---|
| *H01B 11/18* | (2006.01) | |
| *H01B 3/30* | (2006.01) | |
| *H01B 13/016* | (2006.01) | |
| *H01B 11/06* | (2006.01) | |
| *H01B 13/06* | (2006.01) | |

(52) U.S. Cl.
CPC ........... *H01B 11/1834* (2013.01); *H01B 3/30* (2013.01); *H01B 11/1808* (2013.01); *H01B 13/016* (2013.01)

(58) Field of Classification Search
CPC ............ H01B 11/1834; H01B 11/1808; H01B 11/1878; H01B 3/30; H01B 13/222; H05K 9/0098
See application file for complete search history.

(56) References Cited

U.S. PATENT DOCUMENTS

| | | | |
|---|---|---|---|
| 2017/0036412 A1* | 2/2017 | Malloy | .............. D03D 15/0011 |
| 2018/0108455 A1* | 4/2018 | Kobayashi | ........... H01B 11/002 |
| 2019/0371499 A1* | 12/2019 | Huang | ................... H01B 13/14 |

FOREIGN PATENT DOCUMENTS

JP     3671729 B2     7/2005

* cited by examiner

*Primary Examiner* — Hoa C Nguyen
*Assistant Examiner* — Amol H Patel
(74) *Attorney, Agent, or Firm* — McGinn IP Law Group, PLLC (57) ABSTRACT

A high frequency signal transmission cable includes a conductor, an insulator provided over a periphery of the conductor, a plating layer provided over a periphery of the insulator, and a sheath provided over a periphery of the plating layer. A crack suppressing layer is provided between the insulator and the plating layer, in such a manner as to remain in contact with the insulator while being provided with the plating layer over an outer surface of that crack suppressing layer. The crack suppressing layer is composed of a resin film to suppress the occurrence of a cracking in the plating layer by bending while moving in a longitudinal direction of the cable relative to a bending of the insulator.

11 Claims, 3 Drawing Sheets

HIGH FREQUENCY SIGNAL TRANSMISSION CABLE AND PRODUCING METHOD THEREFOR

CROSS-REFERENCE TO RELATED APPLICATIONS

The present invention is based on Japanese Patent Application No. 2019-129378 filed on Jul. 11, 2019, the entire contents of which are incorporated herein by reference.

BACKGROUND OF THE INVENTION

1. Field of the Invention

The present invention relates to a high frequency signal transmission cable and a producing method therefor.

2. Description of the Related Art

As a high frequency signal transmission cable to be wired inside imaging devices to be used in automatic operations and the like, or electronic devices such as smartphones, tablet terminals and the like, a thin diameter coaxial cable having an outer diameter of e.g. 2 mm or less is used.

There is conventionally known such a coaxial cable, that uses a tape member such as a copper tape provided with a copper foil over a resin layer, or the like, as an outer conductor. When a tape member such as a copper tape or the like is helically wrapped, it is known that such a phenomenon called "suck out" as to cause a rapid attenuation in a predetermined frequency band (e.g., a band of several GHz such as 1.25 GHz to 6 GHz or the like) occurs. For the purpose of suppressing that suck out, it is conceivable to configure the outer conductor in such a manner that the tape member is cylindrically wrapped around while adhering tightly to an entire periphery of an insulator.

Note that Japanese Patent No. 3671729 has been disclosed as prior art document information relevant to the invention of the present application.

[Patent Document 1] Japanese Patent No. 3671729

SUMMARY OF THE INVENTION

Now, it is often the case that the coaxial cable to be wired inside imaging devices or electronic devices is wired in such a manner as to be bent in an L shape or an S shape for example, in accordance with a plated printed circuit design or the like. In the coaxial cable with the tape member being cylindrically wrapped around while adhering tightly to the entire periphery of the insulator, when the coaxial cable is bent, a breaking and a wrinkling or a cracking in the tape member may occur, which may lead to a deterioration in high frequency signal transmission properties.

In addition, since the tape member being cylindrically wrapped around while adhering tightly to the entire periphery of the insulator is hard and difficult to bend, it may be difficult to wire the coaxial cable in a narrow space in a small size electronic device. When such a coaxial cable is bent and wired by force, there is a possibility of the high frequency signal transmission properties deteriorating due to the insulator adhering tightly to and being subjected to a compression or the like by the tape member that is difficult to bend. For that reason, the high frequency signal transmission cable that satisfies both the good high frequency signal transmission properties (attenuation properties) and the pliability (flexibility) is desired.

Accordingly, it is an object of the present invention to provide a high frequency signal transmission cable and a producing method therefor that are resistant to the occurrence of a high frequency signal attenuation during transmission, and resistant to the occurrence of a deterioration in high frequency signal transmission properties even when bent and wired in a narrow space.

For the purpose of solving the above problems, the present invention provides a high frequency signal transmission cable, comprising:
  a conductor;
  an insulator provided over a periphery of the conductor;
  a plating layer provided over a periphery of the insulator; and
  a sheath provided over a periphery of the plating layer,
  wherein a crack suppressing layer is provided between the insulator and the plating layer, in such a manner as to remain in contact with the insulator while being provided with the plating layer over an outer surface of that crack suppressing layer,
  wherein the crack suppressing layer comprises a resin film and suppresses the occurrence of a cracking in the plating layer by bending while moving in a longitudinal direction of the cable relative to a bending of the insulator.

Further, for the purpose of solving the above problems, the present invention provides a method for producing a high frequency signal transmission cable comprising a conductor, an insulator provided over a periphery of the conductor, a plating layer provided over a periphery of the insulator, and a sheath provided over a periphery of the plating layer, the method comprising:
  wrapping a resin film around an outer periphery of the insulator; and
  heating the resin film to form a fused or amalgamated portion with a lapped portion of the resin film fusing or amalgamating to itself therein and an unfused or unamalgamated portion with the resin film not fusing or amalgamating to itself therein, to thereby form a crack suppressing layer provided between the insulator and the plating layer in such a manner as to remain in contact with the insulator while being provided with the plating layer over an outer surface of that crack suppressing layer,
  wherein the crack suppressing layer suppresses the occurrence of a cracking in the plating layer by bending while moving in a longitudinal direction of the cable relative to a bending of the insulator.

Points of the Invention

According to the present invention, it is possible to provide the high frequency signal transmission cable and the producing method therefor that are resistant to the occurrence of a high frequency signal attenuation during transmission, and resistant to the occurrence of a deterioration in high frequency signal transmission properties even when bent and wired in a narrow space.

DETAILED DESCRIPTION OF THE PREFERRED EMBODIMENTS

Embodiment

An embodiment of the present invention will be described below with reference to the accompanying drawings.

Figure 1:
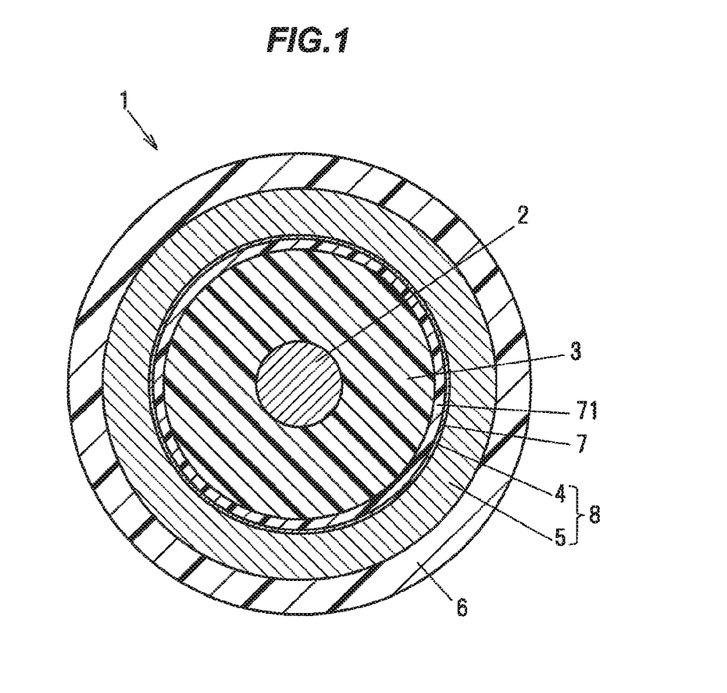
FIG. 1 is a cross-sectional view showing a cross section perpendicular to a longitudinal direction of a high frequency signal transmission cable according to one embodiment of the present invention.

FIG. 1 is a cross-sectional view showing a cross section perpendicular to a longitudinal direction of a high frequency signal transmission cable according to the present embodiment. As shown in FIG. 1, a high frequency signal transmission cable 1 is configured to include an inner conductor 2 as a conductor arranged in a center of the cable 1, an insulator 3 that is provided over a periphery of the inner conductor 2, and a plating layer 4 that is provided over a periphery of the insulator 3, a metal shield layer 5 that is provided over a periphery of the plating layer 4, and a sheath 6 that is provided over a periphery of the metal shield layer 5. That is, the high frequency signal transmission cable 1 according to the present embodiment is configured as a coaxial cable including the inner conductor 2, the insulator 3, an outer conductor 8 (the plating layer 4 and the metal shield layer 5), and the sheath 6. Note that a structure with no metal shield layer 5 being arranged between the plating layer 4 and the sheath 6 may be employed. It should be noted, however, that it is more desirable that the metal shield layer 5 is being arranged between the plating layer 4 and the sheath 6 in order to enhance the transmission properties. The high frequency signal transmission cable 1 is designed to be wired inside imaging devices to be used in automatic operations and the like, or electronic devices such as smartphones, tablet terminals and the like, for example, and has a thin outer diameter (an outer diameter of the sheath 6) of e.g. 2 mm or less, more preferably 1.5 mm or less. Note that the term "provided over" includes a case where the layers are arranged with the other layer therebetween. For example, it includes a case where the other layer may be arranged between the inner conductor 2 and the insulator 3, between the insulator 3 and the outer conductor 8, or between the outer conductor 8 and the sheath 6.

(Inner Conductor 2)

The internal conductor 2 may be a single wire conductor or a stranded wire conductor composed of a plurality of wires stranded together. Further, the inner conductor 2 may be made of a compressed stranded wire conductor composed of a plurality of wires stranded together, and subjected to a compression in such a manner that a cross-sectional shape perpendicular to the longitudinal direction of the cable 1 becomes a predetermined shape such as a circular shape or the like. By using the compressed stranded wire conductor as the inner conductor 2, the wires are adhered tightly to each other with no space between adjacent ones of the plurality of wires, and as a result, the inner conductor 2 using its constituent compressed stranded wire conductor can achieve the enhanced electrical conductivity and the good attenuation properties, and can maintain the high bendability as well. In addition, the compressed stranded wire conductor and the stranded wire conductor are resistant to the occurrence of a wire break when bent, as compared to the single wire conductor.

In order to achieve the good attenuation properties, the electrical conductivity of the inner conductor 2 is desirably 99% IACS or more. For example, when the internal conductor 2 is the compression stranded conductor, an unplated soft copper wire made of a pure copper may be used as the strands of the internal conductor 2 in order to achieve the high electrical conductivity. Further, when the plating has an electrical conductivity of 99% IACS or higher, a soft copper wire subjected to e.g. a silver plating may be used as the strands of the internal conductor 2. In addition, when the wires are compressed through the die, the strands are subjected to the occurrence of a compressive strain, leading to a lowering in the electrical conductivity, but, by thereafter performing a heat treatment (annealing treatment), it is possible to remove the strain and achieve an electrical conductivity of 99% IACS or higher.

(Insulator 3)

As the insulator 3, it is desirable to use an insulating material having as low a permittivity as possible in order to enhance the high frequency signal transmission properties (more specifically, in order to resist the occurrence of a high frequency signal attenuation in a band of e.g. 10 MHz to 6 GHz during transmission). In the present embodiment, the insulating material made of a fluorine resin is being used as the insulator 3. As the fluorine resin to be used in the insulator 3, a PFA (perfluoroalkoxyalkane), an FEP (tetrafluoroethylene/hexafluoropropylene copolymer), a PTFE (polytetrafluoroethylene), and the like are mentioned. The insulator 3 may be provided in such a manner as to be contiguous to the entire periphery of the inner conductor 2.

Note that although it is conceivable to use a foamed resin as the insulator 3, the high frequency signal transmission cable 1 has a thin outer diameter of e.g. 2 mm or less, therefore leading to the thickness of the insulator 3 becoming very thin as well. Since it is difficult to stably produce a thin foamed resin, the fluorine resin having a relatively low permittivity is being used as the insulator 3 in the present embodiment.

(Metal Shield Layer 5)

A crack suppressing layer 7 and the plating layer 4 are in turn provided over the periphery of the insulator 3, and the metal shield layer 5 is provided over the periphery of the plating layer 4 in such a manner as to be in contact with an outer surface of the plating layer 4. The crack suppressing layer 7 and the plating layer 4 will be described later. In the high frequency signal transmission cable 1, the plating layer 4 and the metal shield layer 5 serve as the outer conductor 8.

The metal shield layer 5 together with the plating layer 4 (described later) constitutes the outer conductor 8, and the metal shield layer 5 is constituted by braiding or side by side wrapping with metal wires. The metal shield layer 5, though its details will be described later, also serves to inwardly bind the plating layer 4 and the crack suppressing layer 7 to be described later and keep the distance between the inner conductor 2 and the plating layer 4 substantially constant in the longitudinal direction of the cable 1. As a material for the metal wires to be used in the metal shield layer 5, there is a soft copper wire or a hard copper wire made of e.g. a copper or a copper alloy. Further, the metal wires may be made of an aluminum or an aluminum alloy. The metal wires may be subjected to a plating on its outer surface.

(Sheath 6)

The sheath 6 is made of an insulative resin composition such as a PVC (polyvinyl chloride), a urethane, a polyolefin or the like. Although the sheath 6 is formed by extrusion molding, if solid molding is performed, the resin constituting the sheath 6 enters the spaces between the constituent wires of the metal shield layer 5, and the high frequency signal transmission cable 1 may become hard and difficult to bend. For the purpose of avoiding this, in the present embodiment, the sheath 6 is being molded by tube extrusion. This allows the resin constituting the sheath 6 to be suppressed from entering the spaces between the constituent wires of the metal shield layer 5, and the sheath 6 and the metal shield layer 5 to be moved separately from each other. That is, in the present embodiment, the sheath 6 and the metal shield layer 5 are not adhered to each other, so that the metal shield layer 5 can relatively freely be moved within the sheath 6. This makes the high frequency signal transmission cable 1 easier to bend.

(Plating Layer 4 and Crack Suppressing Layer 7)

Over the periphery of the insulator 3, the crack suppressing layer 7 is provided in such a manner as to be in contact with the outer surface of the insulator 3 with no space forming between the crack suppressing layer 7 and the outer surface of the insulator 3, and in such a manner that, when the high frequency signal transmission cable 1 is bent, the crack suppressing layer 7 can be bent while being moved in the longitudinal direction of the cable 1 relative to the bending of the insulator 3 with the crack suppressing layer 7 remaining in contact with the outer surface of the insulator 3 with no space therebetween (with the crack suppressing layer 7 remaining in contact with the insulator 3 with no space therebetween), and the plating layer 4 is provided over the outer surface of the crack suppressing layer 7. Note that it is possible to observe, by using an optical microscope or an electron microscope, that the crack suppressing layer 7 is in contact with the outer surface of the insulator 3 with no space therebetween.

The crack suppressing layer 7 serves as a foundation layer for the plating layer 4, and when the high frequency signal transmission cable 1 is bent, the crack suppressing layer 7 acts to suppress the occurrence of a cracking in the plating layer 4 resulting from the bending of the insulator 3 following the bending of the high frequency signal transmission cable 1. In other words, the crack suppressing layer 7 is a layer to suppress the occurrence of a cracking in the plating layer 4 by bending while moving in the longitudinal direction of the cable 1 relative to the bending of the insulator 3. Note that the "cracking" referred to herein refers to a cracking in the plating layer 4 that occurs in a range from the outer surface of the plating layer 4 to the inner surface of the plating layer 4 (the surface in contact with the crack suppressing layer 7). Further, the "suppress the occurrence of a cracking in the plating layer 4" referred to herein refers to making the plating layer 4 resistant to the occurrence of a cracking, as compared to when the crack suppressing layer 7 of the present embodiment is not provided.

The crack suppressing layer 7 is provided between the insulator 3 and the plating layer 4, and it is provided in such a manner as to remain in contact with the outer surface of the insulator 3 with no space therebetween, but when the high frequency signal transmission cable 1 is bent, be able to be moved in the longitudinal direction of the cable 1 relative to the insulator 3 (be able to be slid in the longitudinal direction of the cable 1 relative to the insulator 3) while being maintained in contact with the insulator 3 with no space between the crack suppressing layer 7 and the insulator 3. The crack suppressing layer 7 is not being joined to the insulator 3, but is provided in such a manner as to be able to be moved separately from the insulator 3. Further, the crack suppressing layer 7 is cylindrically being provided over the insulator 3.

When the outer diameter of the high frequency signal transmission cable 1 is as thin as 2 mm or less, it is not easy to form the crack suppressing layer 7 by extrusion molding. Accordingly, in the present embodiment, the crack suppressing layer 7 is configured in such a manner as to wrap a resin film 71 around the outer periphery of the insulator 3 (see FIG. 2A), and heat and self-fuse the resin film 71 to thereby form the crack suppressing layer 7 in a cylindrical shape (see FIG. 2B). By heating and self-fusing or self-amalgamating the resin film 71, the crack suppressing layer 7 is formed with a fused or amalgamated portion 71*a* with a lapped portion 71*c* of the resin film 71 fusing or amalgamating to itself therein, and an unfused or unamalgamated portion 71*b* with the resin film 71 not lapping and fusing or amalgamating to itself therein. The "self-fusing or self-amalgamating" referred to herein refers to the resin film 71 fusing or amalgamating to itself at an interface with the resin film 71 overlapping itself.

For the purpose of preventing the constituent resin film 71 of the crack suppressing layer 7 from adhering to the insulator 3 when self-fused or self-amalgamated, a film which is made of a resin having a lower melting point (softening temperature) than that of the resin to be used in the insulator 3, more preferably a resin having a not less than 20° C. lower melting point (softening temperature) than that of the resin to be used in the insulator 3 and which is able to be self-fused or self-amalgamated by heat may be used as the resin film 71. Specifically, e.g. a film made of a polyethylene or a PET (polyethylene terephthalate) can be used as the resin film 71.

A thickness of the crack suppressing layer 7 after self-fusing or self-amalgamating (a straight-line distance from its inner surface in contact with the insulating layer 3 to its outer surface in contact with the plating layer 4) is made thinner than a thickness of the insulator 3, and thicker than a thickness of the plating layer 4. More specifically, the thickness of the crack suppressing layer 7 may be 6 µm or more and 20 µm or less. When the thickness of the crack suppressing layer 7 is 6 µm or more, the crack suppressing layer 7 is enhanced in the mechanical strength and is resistant to the occurrence of a fracture. When the thickness of the crack suppressing layer 7 is 20 µm or less, the outer diameter of the high frequency signal transmission cable 1 becomes small compared to when the thickness of the crack suppressing layer 7 exceeds 20 µm, and therefore the stress applied to the plating layer 4 in the bending with a small bend radius or the like of the high frequency signal transmission cable 1 (the stress applied to the plating layer 4 resulting from deformation of the plating layer 4 following the bending of the high frequency signal transmission cable 1) becomes small, and the plating layer 4 becomes resistant to the occurrence of a cracking, and in addition, it is possible to make the high frequency signal transmission cable 1 small in diameter. In order to achieve the crack suppressing layer 7 having such a thickness, the thickness of the resin film 71 to be used in the crack suppressing layer 7 may be e.g. 3 µm or more and 10 µm or less.

The plating layer 4 together with the metal shield layer 5 constitutes the outer conductor 8. As described above, although the metal shield layer 5 is configured by braiding or side by side wrapping with the metal wires, the use of only the metal shield layer 5 may lead to internal signal radiation from the spaces between the metal wires to the external side, and therefore an increase in the amount of attenuation. By providing the plating layer 4, the spaces between the constituent metal wires of the metal shield layer 5 are impregnated therewith, and the amount of attenuation is therefore further reduced. Note that the plating layer 4 and the metal shield layer 5 are in contact with each other and are electrically connected together.

As the plating layer 4, the plating made of a metal having an electrical conductivity of 99% or more (99% IACS or more) may be used, and e.g., a metal made of copper or silver can be used.

The thickness of the plating layer 4 may be 2 μm or more and 5 μm or less. When the thickness of the plating layer 4 is 2 μm or more, even with the metal shield layer 5 and the plating layer 4 being in contact with each other and being subjected to a bending or the like, the plating layer 4 is resistant to the occurrence of a cracking. Further, when the thickness of the plating layer 4 is 5 μm or less, it is possible to prevent the high frequency signal transmission cable 1 from becoming difficult to bend due to the plating layer 4 becoming hard.

(Method for Producing the High Frequency Signal Transmission Cable 1)

Figure 2A:
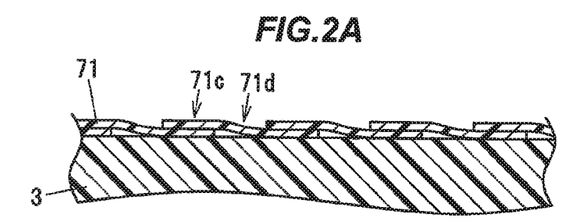
FIGS. 2A to 2D are diagrams for explaining a method for producing a high frequency signal transmission cable according to one embodiment of the present invention.

In producing the high frequency signal transmission cable 1, first, the insulator 3 made of a fluorine resin is provided over the periphery of the inner conductor 2 by extrusion molding. Thereafter, as shown in FIG. 2A, the resin film 71 is wrapped helically around the outer periphery of the insulator 3. At this point of time, the resin film 71 is wrapped in such a manner as to partially overlap itself in its width direction. Hereinafter, a portion with the resin film 71 overlapping itself therein will be referred to as the lapped portion 71c, and a portion with the resin film 71 not overlapping itself therein will be referred to as the unlapped portion 71d. Further, in wrapping the resin film 71, the resin film 71 is wrapped while being subjected to a predetermined tension. This allows the resin film 71 to be wrapped while being brought into contact with the entire periphery of the outer surface of the insulator 3.

Figure 2B:
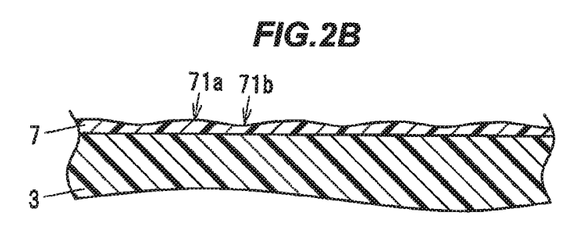

Thereafter, as shown in FIG. 2B, the resin film 71 is heated to soften the resin film 71 and self-fuse the resin film 71. At this point of time, the resin film 71 is heated in such a manner that the temperature of the resin film 71 is not lower than the softening temperature of the resin film 71 and lower than the melting point of the insulator 3. This allows the overlapped portion or the lapped portion 71c of the resin film 71 to melt and amalgamate to itself, to form the fused or amalgamated portion 71a of the crack suppressing layer 7. Note that the fusion or amalgamation of the resin film 71 may be performed by a method other than heating. Further, the unlapped portion 71d of the resin film 71 becomes the unfused or unamalgamated portion 71b of the crack suppressing layer 7 with the resin film 71 not fusing or amalgamating to itself therein. This results in the formation of the cylindrical crack suppressing layer 7 being in contact with but not adhering to the outer surface of the insulator 3, and being able to be moved relative to the insulator 3. Note that, in the present embodiment, since the resin film 71 is being wrapped helically, the fused or amalgamated portion 71a and the unfused or unamalgamated portion 71b of the crack suppressing layer 7 are alternately formed in the longitudinal direction of the cable 1. That is, in the longitudinal direction of the cable 1, the crack suppressing layer 7 is formed with the lapped portion 71c with its constituent resin film 71 overlapping itself therein and the unlapped portion 71d with its constituent resin film 71 not overlapping itself therein, alternately, with its constituent resin film 71 fusing or amalgamating to itself in the lapped portion 71c thereof. By configuring the crack suppressing layer 7 in this manner, it is possible to ensure such a flexibility of the crack suppressing layer 7 that, when the high frequency signal transmission cable 1 is bent, the crack suppressing layer 7 can be bent while the lapped portion 71c of its constituent resin film 71 is being suppressed from peeling outward in radial directions of the cable 1. For that reason, when the high frequency signal transmission cable 1 is bent, the plating layer 4 being provided in such a manner as to adhere tightly to the outer surface of the crack suppressing layer 7 becomes highly bendable by becoming integral with the crack suppressing layer 7. Further, when the crack suppressing layer 7 and the plating layer 4 are bent while being integral with each other and moving relative to the bending of the insulating layer 3, it is possible to suppress the occurrence of a cracking in the plating layer 4 resulting from the bending of the crack suppressing layer 7.

Since the resin film 71 tends to shrink by heating, its thick lapped portion 71c partially moves to its unlapped portion 71d. This makes the thickness of the fused or amalgamated portion 71a of the crack suppressing layer 7 after the self-fusion or self-amalgamation thin compared to the thickness of the lapped portion 71c of the resin film 71 before the self-fusion or self-amalgamation, and also makes the thickness of the unfused or unamalgamated portion 71b of the crack suppressing layer 7 after the self-fusion or self-amalgamation thin compared to the thickness of the unlapped portion 71d of the resin film 71 before the self-fusion or self-amalgamation. As a result, the variation in the thickness of the crack suppressing layer 7 becomes small, so the surface of the crack suppressing layer 7 becomes a substantially smooth curved surface with substantially no uneven portion therein. Note that, in this condition, since the thickness of the fused or amalgamated portion 71a of the crack suppressing layer 7 is slightly larger than the thickness of the unfused or unamalgamated portion 71b of the crack suppressing layer 7, the crack suppressing layer 7 has its slightly undulate surface.

Figure 2C:
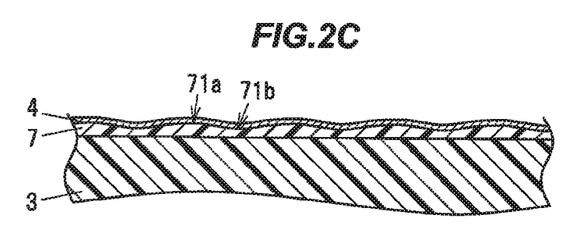

Thereafter, as shown in FIG. 2C, the plating layer 4 is formed over the crack suppressing layer 7. Prior to the formation of the plating layer 4, the outer surface of the crack suppressing layer 7 may be subjected to a predetermined treatment. Specifically, the outer surface of the crack suppressing layer 7 is subjected to a blasting treatment whereby a powder made of dry ice, metal particles, carbon particles, oxide particles, carbide particles, nitride particles, or the like is blasted to the outer surface of the crack suppressing layer 7, to roughen the outer surface of the crack suppressing layer 7 to a predetermined roughness, and the roughened outer surface of the crack suppressing layer 7 is further subjected to a modification treatment such as a corona discharge exposure treatment or the like. Thereafter, the plating layer 4 is formed by applying an electroless plating in such a manner as to coat the entire periphery of the crack suppressing layer 7. As a result, when the plating layer 4 is formed on the outer surface of the crack suppressing layer 7, the plating layer 4 is adhered tightly over the entire periphery of the outer surface of the crack suppressing layer 7, and when the high frequency signal transmission cable 1 is bent, the crack suppressing layer 7 and the plating layer 4 are bent while being integral and moved relative to the bending of the insulating layer 3. This makes it possible to enhance the effect of suppressing the occurrence of a cracking in the plating layer 4. Note that, after applying an electroless plating, an electrolytic plating may further be applied to form the plating layer 4. Since the plating layer 4 is formed along the outer surface of the crack suppressing layer 7, the plating layer 4 to be brought contiguous to the crack suppressing layer 7 is in a slightly undulate surface condition, as with the crack suppressing layer 7.

Figure 2D:
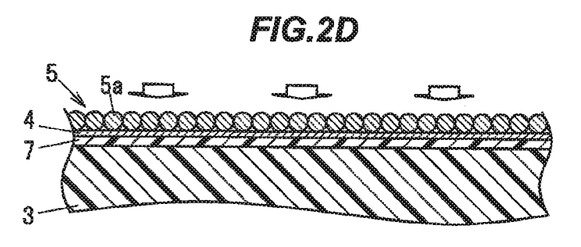

Thereafter, as shown in FIG. 2D, the metal shield layer 5 is formed over the periphery of the plating layer 4. Since the metal shield layer 5 is formed with its constituent metal wires 5a being subjected to a predetermined tension, the plating layer 4 and the crack suppressing layer 7 are acted on by an inward binding force in the radial directions of the cable 1 resulting from the formation of the metal shield layer 5. This inward binding force in the radial directions of the cable 1 allows the crack suppressing layer 7 being flexible as compared to the plating layer 4 to deform, and the thicker fused or amalgamated portion 71a of the crack suppressing layer 7 to be bound inward in the radial directions of the cable 1, and partially move to the unfused or unamalgamated portion 71b of the crack suppressing layer 7, so the crack suppressing layer 7 becomes substantially uniform in thickness. That is, by forming the metal shield layer 5, the plating layer 4 and the crack suppressing layer 7 are bound inward in the radial directions of the cable 1, so the undulations in the surfaces of the crack suppressing layer 7 and the plating layer 4 become very small. As a result, the plating layer 4 and the crack suppressing layer 7 become substantially flat in the longitudinal direction of the cable 1, so the distance between the inner conductor 2 and the plating layer 4 is held substantially constant in the longitudinal direction of the cable 1, resulting in an achievement of uniform characteristic impedance in the longitudinal direction of the cable 1.

Thereafter, the sheath 6 is formed over the periphery of the metal shield layer 5 by tube extrusion, resulting in the high frequency signal transmission cable 1 according to the present embodiment.

In the high frequency signal transmission cable 1 according to the present embodiment, with the metal shield layer 5 being provided therein, the crack suppressing layer 7 is in the substantially flat condition, and it is therefore difficult to observe that the crack suppressing layer 7 includes the fused or amalgamated portion 71a and the unfused or unamalgamated portion 71b. However, by disassembling the high frequency signal transmission cable 1 and taking out the crack suppressing layer 7, it is possible to observe the presence of the fused or amalgamated portion 71a and the unfused or unamalgamated portion 71b. For example, since the fused or amalgamated portion 71a is slightly thick compared to the unfused or unamalgamated portion 71b, by the difference in thickness therebetween being observed with a microscope or the like, it is possible to observe the presence of the fused or amalgamated portion 71a and the unfused or unamalgamated portion 71b. Further, since the crack suppressing layer 7 is not highly rupturable in the fused or amalgamated portion 71a but is highly rupturable in the unfused or unamalgamated portion 71b, it is also possible to determine the presence of the fused or amalgamated portion 71a and the unfused or unamalgamated portion 71b according to whether or not the highly rupturable portions are present at regular intervals in the longitudinal direction of the cable 1.

Figure 3:
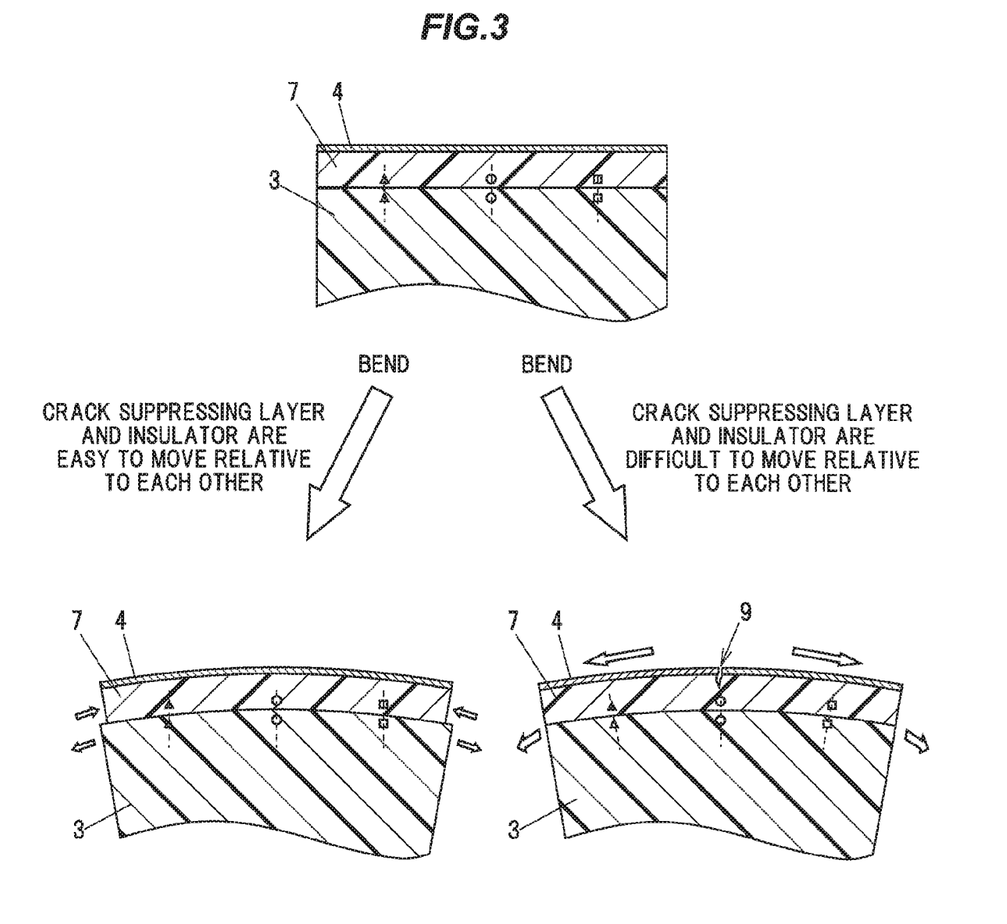
FIG. 3 is a diagram for explaining an effect of a movement of a crack suppressing layer relative to an insulator.

Here is described an advantageous effect of the crack suppressing layer 7 being provided in such a manner as to be able to move relative to the insulator 3. As shown in FIG. 3, the crack suppressing layer 7 can be bent while being moved relative to the bending of the insulator 3. As a result, when the high frequency signal transmission cable 1 is bent, the insulator 3 is bent while being stretched in the longitudinal direction of the cable 1, but the crack suppressing layer 7 can be bent without following the stretching of the insulator 3 in the longitudinal direction of the cable 1, and therefore, the plating layer 4 can be suppressed from stretching in the longitudinal direction of the cable 1. On the other hand, when the crack suppressing layer 7 is difficult to bend while moving relative to the bending of the insulator 3, when the high frequency signal transmission cable 1 is bent, the plating layer 4 is stretched along the outer surface of the insulator 3 in such a manner as to follow the stretching of the insulator 3 in the longitudinal direction of the cable 1, and therefore the plating layer 4 is acted on by a large load and easily subjected to the occurrence of a cracking 9.

When the cracking 9 occurs in the plating layer 4, a phenomenon called co-cracking, that is the occurrence of the cracking 9 in the foundation layers (the crack suppressing layer 7 or the insulator 3) for the plating layer 4 as well as in the plating layer 4, may occur. For that reason, when the plating layer 4 is formed directly on the outer surface of the insulator 3, if the cracking 9 occurs in the plating layer 4 by bending or the like, the co-cracking of the plating layer 4 and the insulator 3 may occur, leading to a failure such as an insulating failure or the like. In the present embodiment, the plating layer 4 is being formed with the crack suppressing layer 7 between it and the insulator 3 which is the member different from the insulator 3, and the crack suppressing layer 7 can be bent while being moved relative to the bending of the insulator 3, and therefore the plating layer 4 is resistant to the occurrence of the cracking 9. Further, even when the plating layer 4 is subjected to the cracking 9, no co-cracking can occur in the insulator 3, so a failure such as an insulating failure or the like can be suppressed.

Furthermore, since the plating layer 4 is being formed over the crack suppressing layer 7 made of the resin film 71, even when the high frequency signal transmission cable 1 having an outer diameter of 2 mm or less is appropriately bent according to a narrow routing layout inside a small size electronic device, the crack suppressing layer 7 can be slid relative to the insulator 3 while being maintained in contact with the outer surface of the insulator 3 with no space therebetween, and therefore the distance between the inner conductor 2 and the plating layer 4 can be held substantially constant. For example, when a metal tape formed with a metal layer on one surface of a resin layer is cylindrically wrapped in place of the plating layer 4 and the crack suppressing layer 7, a wrinkling or a breaking may occur in the metal tape by bending, causing a gap formation between the insulator and the metal tape, or the like, and a local variation in the characteristic impedance, leading to an increase in the return loss due to the mismatching of the characteristic impedance. On the other hand, in the high frequency signal transmission cable 1 according to the present embodiment, since the crack suppressing layer 7 is flexibly deformed according to bending, the distance between the inner conductor 2 and the plating layer 4 is held substantially constant, and so the characteristic impedance can be held substantially constant in the longitudinal direction of the high frequency signal transmission cable 1, while the return loss can be suppressed, resulting in an achievement of the good attenuation properties.

Incidentally, for example, a connector is attached to an end portion of the high frequency signal transmission cable 1. At this point of time, the end portion of the high frequency signal transmission cable 1 is subjected to a termination to expose the plating layer 4, the insulator 3, and the inner conductor 2 in a staircase pattern. In the present embodiment, since the crack suppressing layer 7 and the insulator 3 are not being adhered or joined to each other, the plating layer 4 and the crack suppressing layer 7 can easily be peeled off from the outer surface of the insulator 3, so the termination can easily be performed.

Also, the plating layer 4 and the inner conductor 2 exposed by the termination are each connected to a substrate within the connector by soldering or the like. When the plating layer 4 is connected thereto by soldering or the like, the plating layer 4 is heated. At this point of time, for example, when the plating layer 4 is being formed directly on the outer surface of the insulator 3, the insulator 3 is expanded due to heat, and the plating layer 4 is stretched by following the expansion of the insulator 3, which may therefore cause the plating layer 4 to crack. In the present embodiment, even when the insulator 3 is expanded due to heating the plating layer 4, the crack suppressing layer 7 acts to be slid between the plating layer 4 and the insulator 3 without following this expansion of the insulator 3, so there is also merit that the plating layer 4 is resistant to the occurrence of a cracking resulting from thermal expansion of the insulator 3.

(Functions and Advantageous Effects of the Embodiment)

As described above, the high frequency signal transmission cable 1 according to the present embodiment is configured to include the crack suppressing layer 7 provided between the insulator 3 and the plating layer 4, in such a manner as to remain in contact with the insulator 3 while being provided with the plating layer 4 over the outer surface of that crack suppressing layer 7, wherein the crack suppressing layer 7 is configured with the resin film 71 to suppress the occurrence of a cracking in the plating layer 4 by bending while moving in the longitudinal direction of the cable 1 relative to a bending of the insulator 3.

By wrapping the resin film 71 and self-fusing or self-amalgamating it, it is possible to form the very thin crack suppressing layer 7 that is able to be moved in the longitudinal direction of the cable 1 relative to the insulator 3. As a result, the high frequency signal transmission cable 1 having its outer diameter as thin as 2 mm or less but including the crack suppressing layer 7 can be achieved. As a result, even when the high frequency signal transmission cable 1 is bent and wired in a narrow space inside an electronic device or the like, when the insulator 3 is stretched in the longitudinal direction of the cable 1 according to the bending of the insulator 3, the crack suppressing layer 7 is deformed (bent) in such a manner as to be slid between the plating layer 4 and the insulator 3 without following the stretching of the insulator 3, so no wrinkling or breaking can occur in the plating layer 4, and the distance between the inner conductor 2 and the plating layer 4 can be kept constant. As a result, it is possible to achieve the high frequency signal transmission cable 1 having the good transmission properties (attenuation properties) that is resistant to the occurrence of a high frequency (e.g. a band of 10 MHz to 6 GHz) signal attenuation during transmission.

Note that, although, in the high frequency signal transmission cable 1 according to the above-described embodiment, the crack suppressing layer 7 has been described with the lapped portion 71c of its constituent resin film 71 being self-fused or self-amalgamated, when the above-described actions and effects can be achieved, the lapped portion 71c of the resin film 71 may be joined to itself by using a method other than the fusing or amalgamating. In addition, it is more desirable that the lapped portion 71c of the constituent resin film 71 of the crack suppressing layer 7 is fusing or amalgamating to itself at its entire contact interface, but when the above-described actions and effects can be achieved, the lapped portion 71c of the constituent resin film 71 of the crack suppressing layer 7 may be fusing or amalgamating to itself at a part of its contact interface. In this case, at least a boundary portion between the lapped portion 71c and the unlapped portion 71d may be fusing or amalgamating to itself.

Further, by providing the metal shield layer 5 over the periphery of the plating layer 4, it is possible to allow the metal shield layer 5 to bind the plating layer 4 and the crack suppressing layer 7 inward in the radial directions of the cable 1 to make the plating layer 4 and the crack suppressing layer 7 substantially flat, and hold the distance between the inner conductor 2 and the plating layer 4 substantially constant, resulting in an achievement of uniform characteristic impedance in the longitudinal direction of the cable 1, and better attenuation properties.

In addition, since the crack suppressing layer 7 is able to be moved in the longitudinal direction of the cable 1 relative to the insulator 3, the high frequency signal transmission cable 1 becomes highly bendable, and it is therefore possible to achieve the high frequency signal transmission cable 1 that is resistant to the occurrence of a deterioration in the high frequency signal transmission properties even when wired in a narrow space within electronic devices or the like.

Summary of the Embodiment

Next, the technical ideas grasped from the above-described embodiments will be described with the aid of the reference characters and the like in the embodiments. It should be noted, however, that each of the reference characters and the like in the following descriptions is not to be construed as limiting the constituent elements in the claims to the members and the like specifically shown in the embodiments.

[1] A high frequency signal transmission cable (1), comprising: a conductor (2); an insulator (3) provided over a periphery of the conductor (2); a plating layer (4) provided over a periphery of the insulator (3); and a sheath (6) provided over a periphery of the plating layer (4), wherein a crack suppressing layer (7) is provided between the insulator (3) and the plating layer (4), in such a manner as to remain in contact with the insulator (3) while being provided with the plating layer (4) over an outer surface of that crack suppressing layer (7), the crack suppressing layer (7) comprises a resin film (71) and suppresses the occurrence of a cracking in the plating layer (4) by bending while moving in a longitudinal direction of the cable (1) relative to a bending of the insulator (3).

[2] The high frequency signal transmission cable (1) according to [1] above, wherein the crack suppressing layer (7) includes a lapped portion (71c) with the resin film (71) overlapping itself therein, and an unlapped portion (71d) with the resin film (71) not overlapping itself therein, wherein the lapped portion (71c) and the unlapped portion (71d) are alternately formed in the longitudinal direction of the cable (1), and wherein the resin film (71) is fused or amalgamated to itself in the lapped portion (71c) thereof.

[3] The high frequency signal transmission cable (1) according to [1] or [2] above, wherein a thickness of the crack suppressing layer (7) is thinner than a thickness of the insulator (3), and thicker than a thickness of the plating layer (4).

[4] The high frequency signal transmission cable (1) according to any one of [1] to [3] above, wherein the crack suppressing layer (7) comprises a thickness of 6 μm or more and 20 μm or less.

[5] The high frequency signal transmission cable (1) according to any one of [1] to [4] above, wherein the plating layer (4) comprises a thickness of 2 μm or more and 5 μm or less.

[6] The high frequency signal transmission cable (1) according to any one of [1] to [5] above, wherein a melting point of the resin film (71) is lower than a melting point of a resin to be used in the insulator (3).

[7] The high frequency signal transmission cable (1) according to any one of [1] to [6] above, wherein the insulator (3) is made of a fluorine resin.

[8] A method for producing a high frequency signal transmission cable (1) comprising a conductor (2), an insulator (3) provided over a periphery of the conductor (2), a plating layer (4) provided over a periphery of the insulator (3), and a sheath (6) provided over a periphery of the plating layer (4), the method comprising: wrapping a resin film (71) around an outer periphery of the insulator (3); and heating the resin film (71) to form a fused or amalgamated portion (71a) with a lapped portion (71c) of the resin film (71) fusing or amalgamating to itself therein, and an unfused or unamalgamated portion (71b) with the resin film (71) not fusing or amalgamating to itself therein, to thereby form a crack suppressing layer (7) provided between the insulator (3) and the plating layer (4) in such a manner as to remain in contact with the insulator (3) while being provided with the plating layer (4) over an outer surface of that crack suppressing layer (7), wherein the crack suppressing layer (7) suppresses the occurrence of a cracking in the plating layer (4) by bending while moving in a longitudinal direction of the cable (1) relative to a bending of the insulator (3).

Although the embodiments of the present invention have been described above, the above described embodiments are not to be construed as limiting the inventions according to the claims. Further, it should be noted that not all the combinations of the features described in the embodiments are indispensable to the referred to herein refers to for solving the problem of the invention.

Further, the present invention can appropriately be modified and implemented without departing from the spirit thereof. For example, although, in the above-described embodiment, the resin film 71 is being wrapped helically around the periphery of the insulator 3 and thereafter self-fused or self-amalgamated to form the crack suppressing layer 7, the way to form the crack suppressing layer 7 is not limited to this, but the crack suppressing layer 7 may be formed by cylindrically wrapping the resin film 71 around the periphery of the insulator 3 and thereafter self-fusing or self-amalgamating the resin film 71. In this case, for example, the crack suppressing layer 7 may be formed by helically wrapping a tape or a wire while cylindrically wrapping the resin film 71 so as to hold the wrapped resin film 71, and by heating and self-fusing or self-amalgamating the resin film 71, and thereafter removing that tape or wire.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A high frequency signal transmission cable, comprising:
   a conductor;
   an insulator provided over a periphery of the conductor;
   a plating layer provided over a periphery of the insulator; and
   a sheath provided over a periphery of the plating layer,
   wherein a crack suppressing layer is provided between the insulator and the plating layer, in such a manner as to remain in contact with the insulator while being provided with the plating layer over an outer surface of that crack suppressing layer,
   wherein the crack suppressing layer comprises a resin film and suppresses the occurrence of a cracking in the plating layer by bending while moving in a longitudinal direction of the cable relative to a bending of the insulator,
   wherein the crack suppressing layer includes a lapped portion with the resin film overlapping itself therein, and an unlapped portion with the resin film not overlapping itself therein,
   wherein the lapped portion and the unlapped portion are alternately formed in the longitudinal direction of the cable, and
   wherein the resin film is fused or amalgamated to itself in the lapped portion.

2. The high frequency signal transmission cable according to claim 1, wherein a thickness of the crack suppressing layer is thinner than a thickness of the insulator, and thicker than a thickness of the plating layer.

3. The high frequency signal transmission cable according to claim 1, wherein the crack suppressing layer comprises a thickness of 6 μm or more and 20 μm or less.

4. The high frequency signal transmission cable according to claim 1, wherein the plating layer comprises a thickness of 2 μm or more and 5 μm or less.

5. The high frequency signal transmission cable according to claim 1, wherein the insulator comprises a fluorine resin.

6. A high frequency signal transmission cable, comprising:
   a conductor;
   an insulator provided over a periphery of the conductor;
   a plating layer provided over a periphery of the insulator; and
   a sheath provided over a periphery of the plating layer,
   wherein a crack suppressing layer is provided between the insulator and the plating layer, in such a manner as to remain in contact with the insulator while being provided with the plating layer over an outer surface of that crack suppressing layer,
   wherein the crack suppressing layer comprises a resin film and suppresses the occurrence of a cracking in the plating layer by bending while moving in a longitudinal direction of the cable relative to a bending of the insulator, and
   wherein a melting point of the resin film is lower than a melting point of a resin to be used in the insulator.

7. The high frequency signal transmission cable according to claim 6, wherein a thickness of the crack suppressing layer is thinner than a thickness of the insulator, and thicker than a thickness of the plating layer.

8. The high frequency signal transmission cable according to claim 6, wherein the crack suppressing layer comprises a thickness of 6 μm or more and 20 μm or less.

9. The high frequency signal transmission cable according to claim 6, wherein the plating layer comprises a thickness of 2 μm or more and 5 μm or less.

10. The high frequency signal transmission cable according to claim 6, wherein the insulator comprises a fluorine resin.

11. A method for producing a high frequency signal transmission cable comprising a conductor, an insulator provided over a periphery of the conductor, a plating layer provided over a periphery of the insulator, and a sheath provided over a periphery of the plating layer, the method comprising:
    wrapping a resin film around an outer periphery of the insulator, and
    heating the resin film to form a fused or amalgamated portion with a lapped portion of the resin film fusing or amalgamating to itself therein and an unfused or unamalgamated portion with the resin film not fusing or amalgamating to itself therein, to thereby form a crack suppressing layer provided between the insulator and the plating layer in such a manner as to remain in contact with the insulator while being provided with the plating layer over an outer surface of that crack suppressing layer, wherein the crack suppressing layer suppresses the occurrence of a cracking in the plating layer by bending while moving in a longitudinal direction of the cable relative to a bending of the insulator.

* * * * *